(12) United States Patent
Iwata

(10) Patent No.: US 7,304,646 B2
(45) Date of Patent: Dec. 4, 2007

(54) IMAGE DATA STRUCTURE FOR DIRECT MEMORY ACCESS

(75) Inventor: Eiji Iwata, Austin, TX (US)

(73) Assignee: Sony Computer Entertainment Inc. (JP)

( * ) Notice: Subject to any disclaimer, the term of this patent is extended or adjusted under 35 U.S.C. 154(b) by 245 days.

(21) Appl. No.: 10/922,670

(22) Filed: Aug. 19, 2004

(65) Prior Publication Data

US 2006/0038821 A1 Feb. 23, 2006

(51) Int. Cl.
*G06F 13/00* (2006.01)
*G09G 5/36* (2006.01)

(52) U.S. Cl. .............. 345/537; 345/538; 345/547

(58) Field of Classification Search .......... 345/537, 345/538, 547; 710/22, 34
See application file for complete search history.

(56) References Cited

U.S. PATENT DOCUMENTS

| | | | |
|---|---|---|---|
| 5,313,576 A | 5/1994 | Providenza et al. | |
| 5,736,988 A | 4/1998 | Shaw et al. | |
| 5,812,791 A | 9/1998 | Wasserman et al. | |
| 5,854,640 A | 12/1998 | North et al. | |
| 5,973,707 A | 10/1999 | Mita | |
| 5,982,396 A | 11/1999 | Kim | |
| 6,026,239 A | 2/2000 | Patrick et al. | |
| 6,275,533 B1 | 8/2001 | Nishi | |
| 6,353,440 B1 | 3/2002 | Keene | |
| 6,466,227 B1 * | 10/2002 | Pfister et al. ............ 345/619 |
| 6,636,222 B1 | 10/2003 | Valmiki et al. | |
| 6,661,422 B1 | 12/2003 | Valmiki et al. | |
| 6,670,960 B1 | 12/2003 | Evoy | |
| 6,671,418 B2 | 12/2003 | Rengakuji et al. | |
| 6,795,874 B2 * | 9/2004 | Martin et al. ........... 710/20 |
| 6,999,091 B2 * | 2/2006 | Saxena et al. ........... 345/566 |
| 7,061,496 B2 * | 6/2006 | Yi et al. ............... 345/531 |
| 2002/0031179 A1 | 3/2002 | Rovati et al. | |
| 2002/0041626 A1 | 4/2002 | Yoshioka et al. | |
| 2002/0101931 A1 | 8/2002 | Yoo et al. | |
| 2002/0126124 A1 | 9/2002 | Baldwin et al. | |

(Continued)

FOREIGN PATENT DOCUMENTS

EP 1 331 604 A1 7/2003

(Continued)

OTHER PUBLICATIONS

"Cliff Notes on MPEG-1 and MPEG-2 FAQs" as found at the address <http://www.digitalconnection.com/Support/cliffnotes_2.htmDigital Connection Technical Support—Cliff Notes . . . > (Retrieved circa Feb. 2004).

(Continued)

*Primary Examiner*—Kee M. Tung
*Assistant Examiner*—Hau H Nguyen
(74) *Attorney, Agent, or Firm*—Lerner, David, Littenberg, Krumholz & Mentlik, LLP

(57) ABSTRACT

A method is provided for transferring data for processing of an image between a first memory and a second memory accessible by a processor. According to such method, data is provided in the first memory for processing of the image, the data being organized into a plurality of blocks, wherein each block relates to a portion of the image. At least some of the data is transferred by a direct memory access controller in units of a block between the first memory and a second memory accessible by the processor.

19 Claims, 8 Drawing Sheets

U.S. PATENT DOCUMENTS

2002/0196853 A1  12/2002  Liang et al.
2003/0016584 A1  1/2003  LaFage et al.
2003/0031258 A1  2/2003  Wang et al.
2003/0122837 A1  7/2003  Saxena et al.
2003/0152148 A1  8/2003  Laksono
2006/0023785 A1*  2/2006  Aggarwal et al. ..... 375/240.12

OTHER PUBLICATIONS

"A Beginners Guide for MPEG-2 Standard" as found at the address <http://www.fh-friedberg.de/fachbereiche/e2/telekom-labor/zinke/mk/mpeg2beg/beginnzi.htmABeginners Guide . . . > (Retrieved circa Feb. 2004).

"MPEG-2 The Basics of How It Works" as found at the address <www.educatorscorner.com/media/SLDPRE_MPEGtutorial1.pdf> (Retrieved circa Feb. 2004).

* cited by examiner

IMAGE DATA STRUCTURE FOR DIRECT MEMORY ACCESS

BACKGROUND OF THE INVENTION

The present invention relates to the organization and operation of a data processor, especially as relates to the transfer of image data between a first memory, such as a memory local to a data processor and another memory.

A large amount of data is typically required to be transferred for processing from a memory to a processor to produce high-quality images for display, particularly video images at display rates and resolutions equaling or exceeding that of standard television receivers, videotape recorders (VTRs), digital video disc (DVD) players, and the like.

In recent years, digital video compression standards such as the standard adopted by the International Organization for Standards (ISO), commonly referred to as MPEG-2 (Motion Picture Experts Group), have been developed to reduce the amount of data needed to display images of acceptable quality including video images.

However, despite the reduced amount of data needed to be transferred from memory to a processor, certain problems still exist which cause image data transfer operations to be inefficient and potentially cause bottlenecks affecting image processing performance.

A particular challenge for increasing the performance of an image processing system is to reduce the amount of overhead to transfer data for processing an image by way of a direct memory access controller (DMAC). A DMAC typically has hardware designed to handle transfers of data of a predetermined minimum size over a bus between a main memory and a local memory, such minimum size being known as "the hardware transfer size." Such operation is generally well-adapted for the transfer of portions of an instruction stream and associated data from a main memory to a local memory of a processor, because the instructions in an instruction stream generally occupy contiguous areas of memory, as do the associated data. Thus, instructions and/or associated data can be transferred in units of the hardware transfer size of the DMAC.

However, that is not the case with image data. In the case of image data, data to be processed such as MPEG-2 data, is frequently arranged in a way that it is not easily transferred between a main memory and another memory in units of the hardware transfer size of the DMAC. The data may be arranged in memory in form of many lines of memory, so as to require fetching and storing of the lines of data on a line-by-line basis. This leads to at least two problems. One problem is that the DMAC must conduct a large number of operations to transfer all the lines of data from the one memory to another. A DMAC is typically designed to handle a finite number of data transfer operations at once. A large number of requests for transferring data received at one time, e.g., from a processor, could exceed the capabilities of the DMAC, and cause the DMAC to refuse the request. This in turn, could cause the processor issuing the request to be stalled until the transfer requests are accepted. Another problem is that a line of memory is generally smaller than the hardware transfer size of the DMAC. For example, in one system, a line of image data has 16 bytes of memory, while the hardware transfer size is 128 bytes. In such case, a large percentage (87.5%) of the data being transferred by one transfer operation (128 bytes) is discarded, because only the 16 bytes included in the line of memory are useful. Thus, under these conditions, the system is said to have a "bus efficiency" of 12.5%.

Accordingly, it would be desirable to provide a system and method of transferring data is desired which reduces a number of transfer operations performed by a direct memory access controller (DMAC) for transferring image data and which increases bus efficiency for transferring image data to a much higher level than before.

SUMMARY OF THE INVENTION

According to an aspect of the invention, a method is provided for transferring data for processing of an image between a first memory and a second memory accessible by a processor. According to such method, data is provided in the first memory for processing of the image, the data being organized into a plurality of blocks, wherein each block relates to a portion of the image. At least some of the data is transferred by a direct memory access controller in units of a block between the first memory and the second memory.

According to another aspect of the invention, a processor is provided which is operable to process data for display of an image, the data being organized into a plurality of blocks stored in a first memory. According to this aspect, the processor is operable to control a direct memory access controller to transfer the data in units of a block from the first memory to a second memory accessible by the processor, the processor being further operable to access the data from the second memory to process the data.

According to another aspect of the invention, a system is provided which includes a processor and a first memory operable to store data for processing of an image by the processor, the data being organized into a plurality of blocks, as well as a second memory accessible by the processor. The system further includes a direct memory access controller operable to transfer at least some of the data between the first memory and the second memory in units of a block.

According to yet another aspect of the invention, a system is provided which includes a plurality of processors each operable to process data for display of an image, the data being organized into a plurality of blocks stored in a main memory. According to this aspect, the system further includes a direct memory access controller operable upon request of a processor of the plurality of processors to transfer at least some of the data between the main memory and a local memory dedicated to the requesting processor in units of a block.

According to still another aspect of the invention, a system is provided which includes a plurality of processors and a main memory shared by the plurality of processors, the main memory operable to store data for processing of an image by at least one of the processors, and the data being organized into a plurality of blocks. The system according to this aspect of the invention further includes a plurality of local memories, each local memory being dedicated to a particular processor of the plurality of processors and a direct memory access controller operable upon request of a processor of the plurality of processors to transfer at least some of the data between the main memory and the local memory dedicated to the requesting processor in units of a block.

According to yet another aspect of the invention, a recording medium is provided, having instructions recorded thereon for performing a method of transferring data for processing of an image between a first memory and a second memory accessible by a processor. The method includes providing data in the first memory for processing of the image, the data being organized into a plurality of blocks, wherein each block relates to a portion of the image. At least some of the data is transferred by a direct memory access controller in units of a block between the first memory and a second memory.

DETAILED DESCRIPTION

Figure 1:
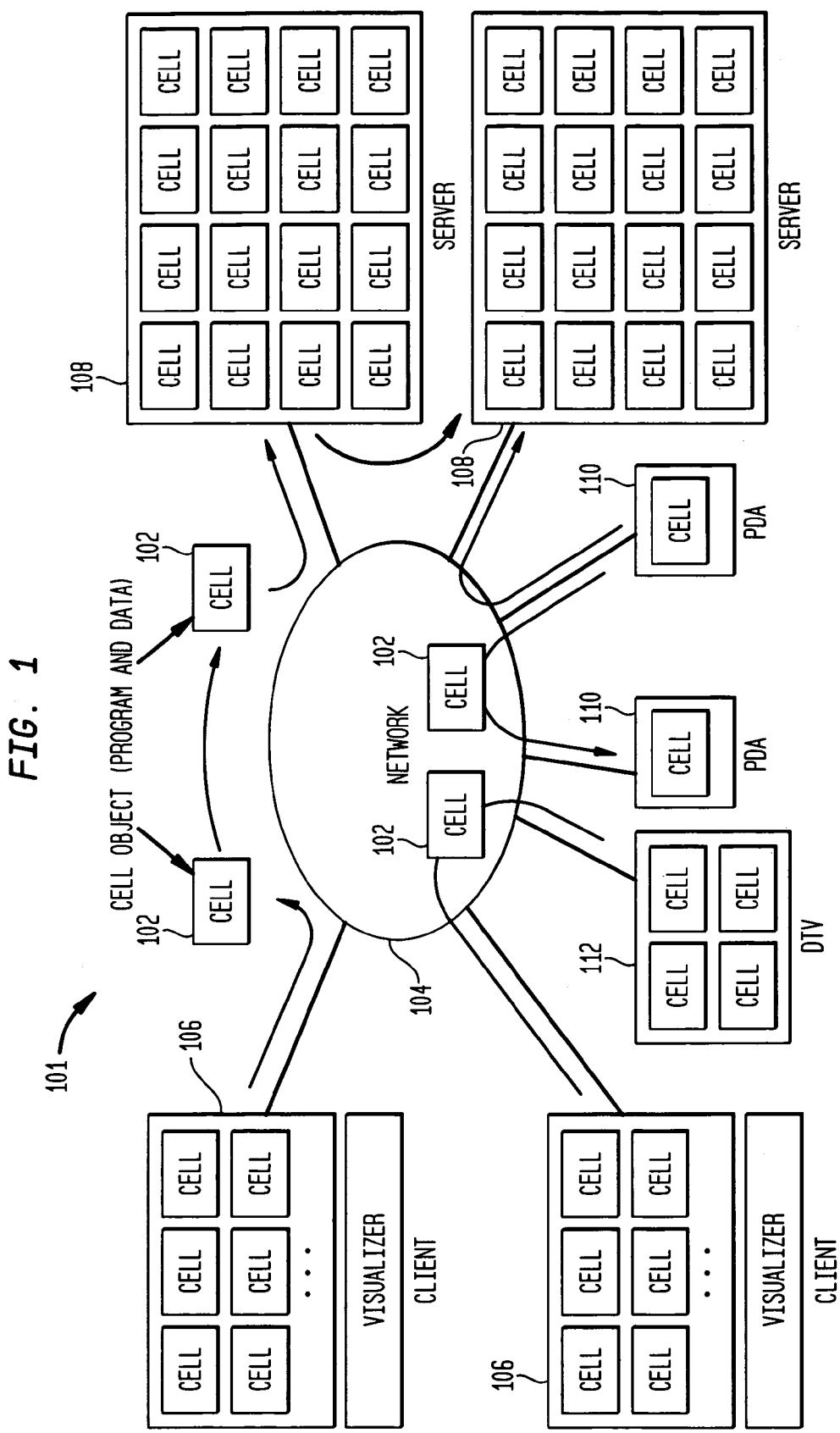
FIG. 1 illustrates the overall architecture of a computer network in accordance with the present invention.

The following description of the embodiments of the invention are best understood in relation to a computer system in which particular embodiments are advantageously employed, and which other embodiments advantageously form a part of. The overall architecture for such computer system 101 is shown in FIG. 1.

As illustrated in this figure, system 101 includes network 104 to which is connected a plurality of computers and computing devices. Network 104 can be a local area network (LAN), a global network, such as the Internet, or any other computer network.

The computers and computing devices connected to network 104 (the network's "members") include, e.g., client computers 106, server computers 108, personal digital assistants (PDAs) 110, digital television (DTV) 112 and other wired or wireless computers and computing devices. The processors employed by the members of network 104 are constructed from the same common computing module. These processors also preferably all have the same instruction set architecture (ISA) and perform processing in accordance with the same instruction set. The number of modules included within any particular processor depends upon the processing power required by that processor.

For example, since servers 108 of system 101 perform more processing of data and applications than clients 106, servers 108 contain more computing modules than clients 106. PDAs 110, on the other hand, perform the least amount of processing. PDAs 110, therefore, contain the smallest number of computing modules. DTV 112 performs a level of processing between that of clients 106 and servers 108. DTV 112, therefore, contains a number of computing modules between that of clients 106 and servers 108. As discussed below, each computing module contains a processing controller and a plurality of identical processing units for performing parallel processing of the data and applications transmitted over network 104.

This homogeneous configuration for system 101 facilitates adaptability, processing speed and processing efficiency. Because each member of system 101 performs processing using one or more (or some fraction) of the same computing module, the particular computer or computing device performing the actual processing of data and applications is unimportant. The processing of a particular application and data, moreover, can be shared among the network's members. By uniquely identifying the cells comprising the data and applications processed by system 101 throughout the system, the processing results can be transmitted to the computer or computing device requesting the processing regardless of where this processing occurred. Because the modules performing this processing have a common structure and employ a common ISA, the computational burdens of an added layer of software to achieve compatibility among the processors is avoided. This architecture and programming model facilitates the processing speed necessary to execute, e.g., real-time, multimedia applications.

To take further advantage of the processing speeds and efficiencies facilitated by system 101, the data and applications processed by this system are packaged into uniquely identified, uniformly formatted software cells 102. Each software cell 102 contains, or can contain, both applications and data. Each software cell also contains an ID to globally identify the cell throughout network 104 and system 101. This uniformity of structure for the software cells, and the software cells' unique identification throughout the network, facilitates the processing of applications and data on any computer or computing device of the network. For example, a client 106 may formulate a software cell 102 but, because of the limited processing capabilities of client 106, transmit this software cell to a server 108 for processing. Software cells can migrate, therefore, throughout network 104 for processing on the basis of the availability of processing resources on the network.

The homogeneous structure of processors and software cells of system 101 also avoids many of the problems of today's heterogeneous networks. For example, inefficient programming models that seek to permit processing of applications on any ISA using any instruction set, e.g., virtual machines such as the Java virtual machine, are avoided. System 101, therefore, can implement broadband processing far more effectively and efficiently than today's networks.

Figure 2:
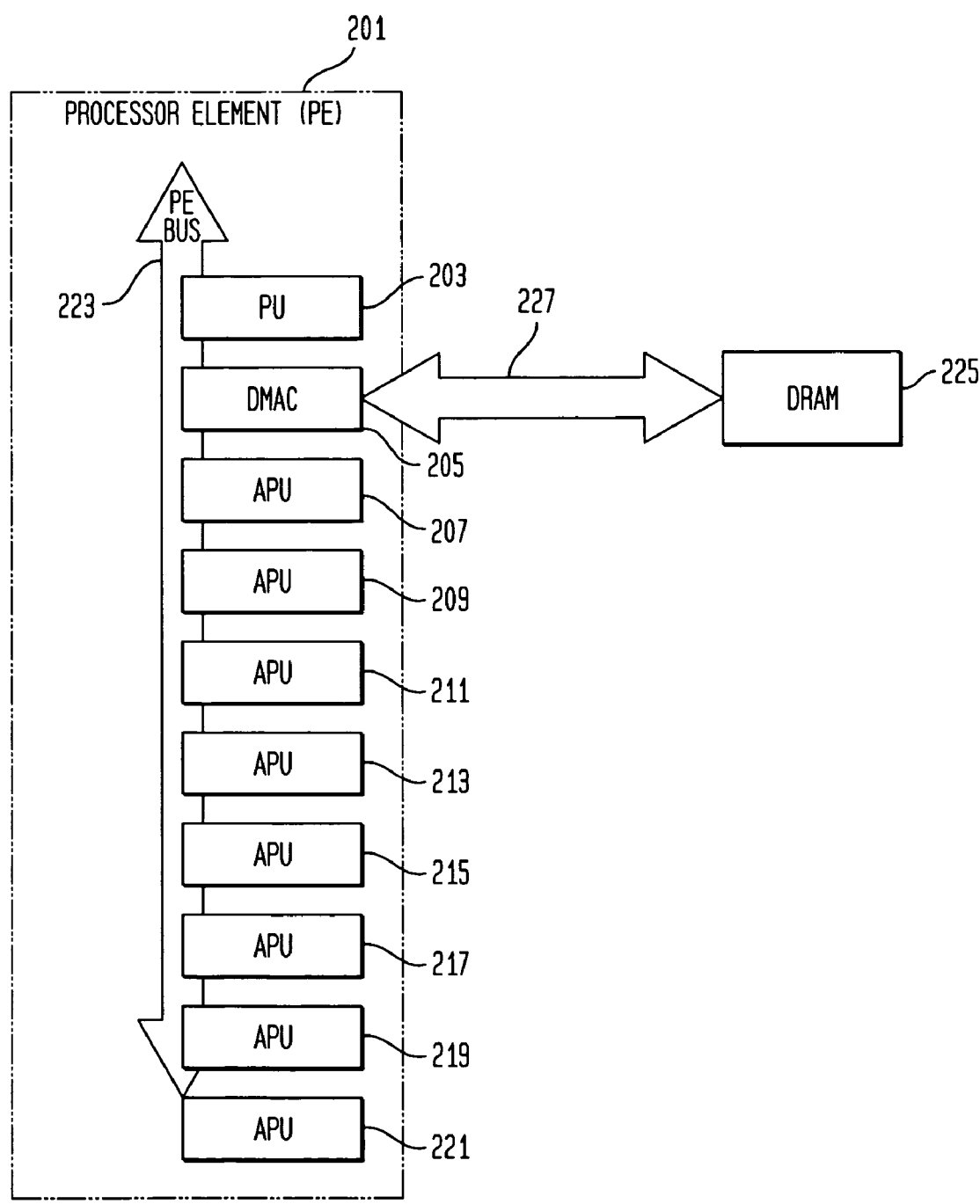
FIG. 2 is a diagram illustrating the structure of a processor element (PE) in accordance with the present invention.

The basic processing module for all members of network 104 is the processor element (PE). FIG. 2 illustrates the structure of a PE. As shown in this figure, PE 201 comprises a processing unit (PU) 203, a direct memory access controller (DMAC) 205 and a plurality of synergistic processing units (SPUs) also referred to as attached processing units (APUs) herein, namely, APU 207, APU 209, APU 211, APU 213, APU 215, APU 217, APU 219 and APU 221. A local PE bus 223 transmits data and applications among the APUs, DMAC 205 and PU 203. Local PE bus 223 can have, e.g., a conventional architecture or be implemented as a packet switch network. Implementation as a packet switch network, while requiring more hardware, increases available bandwidth.

PE 201 can be constructed using various methods for implementing digital logic. PE 201 preferably is constructed, however, as a single integrated circuit employing a complementary metal oxide semiconductor (CMOS) on a silicon substrate. Alternative materials for substrates include gallium arsenide, gallium aluminum arsenide and other so-called III-V compounds employing a wide variety of dopants. PE 201 also could be implemented using superconducting material, e.g., rapid single-flux-quantum (RSFQ) logic.

PE 201 is closely associated with a dynamic random access memory (DRAM) 225 through a high bandwidth memory connection 227. DRAM 225 functions as the main memory for PE 201. Although a DRAM 225 preferably is a dynamic random access memory, DRAM 225 could be implemented using other means, e.g., as a static random access memory (SRAM), a magnetic random access memory (MRAM), an optical memory or a holographic memory. DMAC 205 facilitates the transfer of data between DRAM 225 and the APUs and PU of PE 201. As further discussed below, DMAC 205 designates for each APU an exclusive area in DRAM 225 into which only the APU can write data and from which only the APU can read data. This exclusive area is designated a "sandbox."

PU 203 can be, e.g., a standard processor capable of stand-alone processing of data and applications. In operation, PU 203 schedules and orchestrates the processing of data and applications by the APUs. The APUs preferably are single instruction, multiple data (SIMD) processors. Under the control of PU 203, the APUs perform the processing of these data and applications in a parallel and independent manner. DMAC 205 controls accesses by PU 203 and the APUs to the data and applications stored in the shared DRAM 225. Although PE 201 preferably includes eight APUs, a greater or lesser number of APUs can be employed in a PE depending upon the processing power required. Also, a number of PEs, such as PE 201, may be joined or packaged together to provide enhanced processing power.

Figure 3:
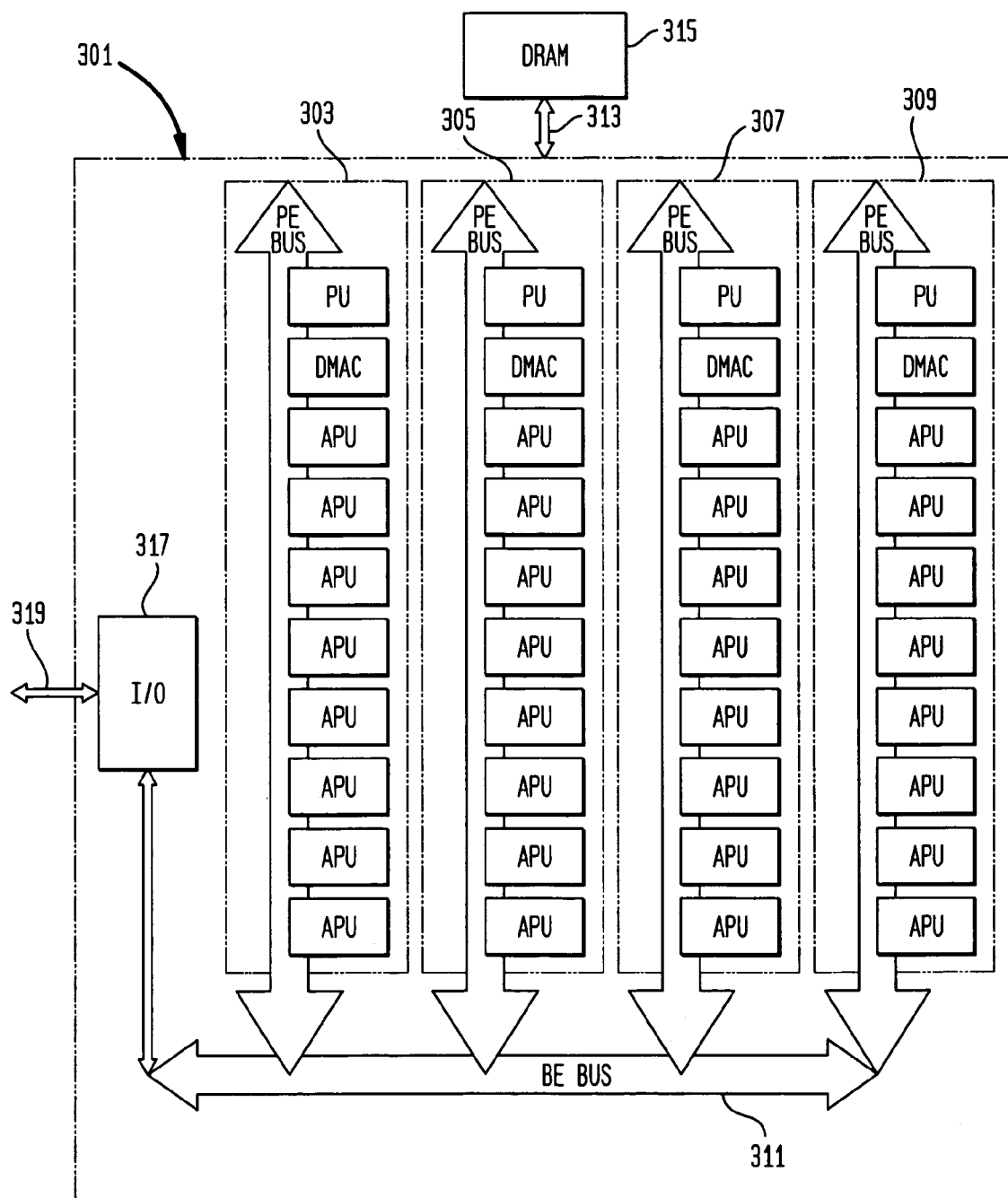
FIG. 3 is a diagram illustrating the structure of a broadband engine (BE) in accordance with the present invention.

For example, as shown in FIG. 3, four PEs may be packaged or joined together, e.g., within one or more chip packages, to form a single processor for a member of network 104. This configuration is designated a broadband engine (BE). As shown in FIG. 3, BE 301 contains four PEs, namely, PE 303, PE 305, PE 307 and PE 309. Communications among these PEs are over BE bus 311. Broad bandwidth memory connection 313 provides communication between shared DRAM 315 and these PEs. In lieu of BE bus 311, communications among the PEs of BE 301 can occur through DRAM 315 and this memory connection. Alternatively, DRAM 315 can be incorporated in BE 301, having a connection to BE bus 311, in which case the DRAM 315 is accessible via bus 311 for transfer of data thereto and therefrom by each of the PEs 303, 305, 307 and 309.

Input/output (I/O) interface 317 and external bus 319 provide communications between broadband engine 301 and the other members of network 104. Each PE of BE 301 performs processing of data and applications in a parallel and independent manner analogous to the parallel and independent processing of applications and data performed by the APUs of a PE.

Figure 4:
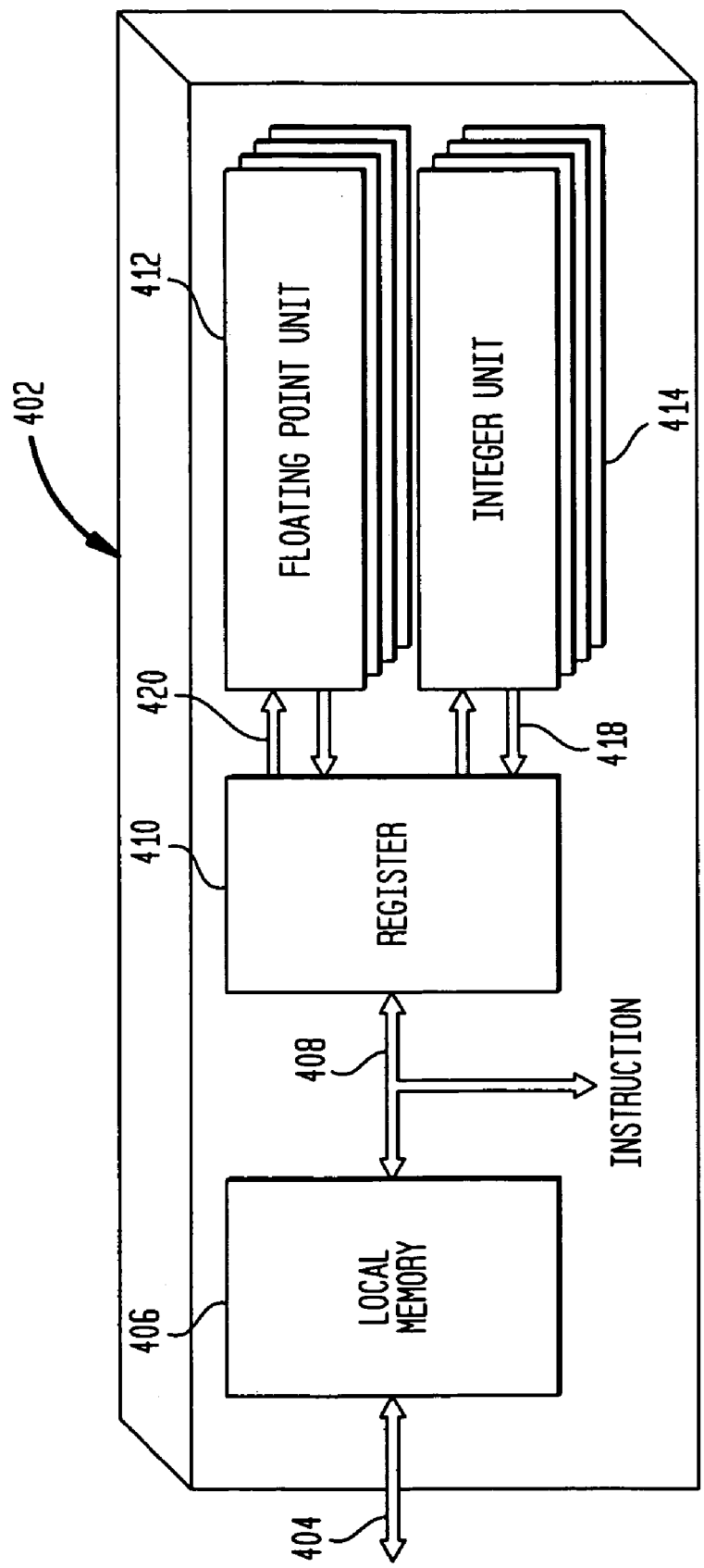
FIG. 4 is a diagram illustrating the structure of an attached processing unit (APU) in accordance with the present invention.

FIG. 4 illustrates the structure of an APU. APU 402 includes local memory 406, registers 410, four floating-point units 412 and four integer units 414. Again, however, depending upon the processing power required, a greater or lesser number of floating point units 512 and integer units 414 can be employed. In a preferred embodiment, local memory 406 contains 128 kilobytes of storage, and the capacity of registers 410 is 128×128 bits. Floating-point units 412 preferably operate at a speed of 32 billion floating-point operations per second (32 GFLOPS), and integer units 414 preferably operate at a speed of 32 billion operations per second (32 GOPS).

Local memory 406 is not a cache memory. Local memory 402 is preferably constructed as an SRAM. Cache coherency support for an APU is unnecessary. A PU may require cache coherency support for direct memory accesses initiated by the PU. Cache coherency support is not required, however, for direct memory accesses initiated by an APU or for accesses from and to external devices.

APU 402 further includes bus 404 for transmitting applications and data to and from the APU. In a preferred embodiment, this bus is 1,024 bits wide. APU 402 further includes internal busses 408, 420 and 418. In a preferred embodiment, bus 408 has a width of 256 bits and provides communications between local memory 406 and registers 410. The APU 402 is generally capable of accessing the local memory at a faster rate than it is for DRAM 225. Busses 420 and 418 provide communications between, respectively, registers 410 and floating-point units 412, and registers 410 and integer units 414. In a preferred embodiment, the width of busses 418 and 420 from registers 410 to the floating point or integer units is 384 bits, and the width of busses 418 and 420 from the floating point or integer units to registers 410 is 128 bits. The larger width of these busses from registers 410 to the floating point or integer units than from these units to registers 410 accommodates the larger data flow from registers 410 during processing. A maximum of three words are needed for each calculation. The result of each calculation, however, normally is only one word.

Figure 5:
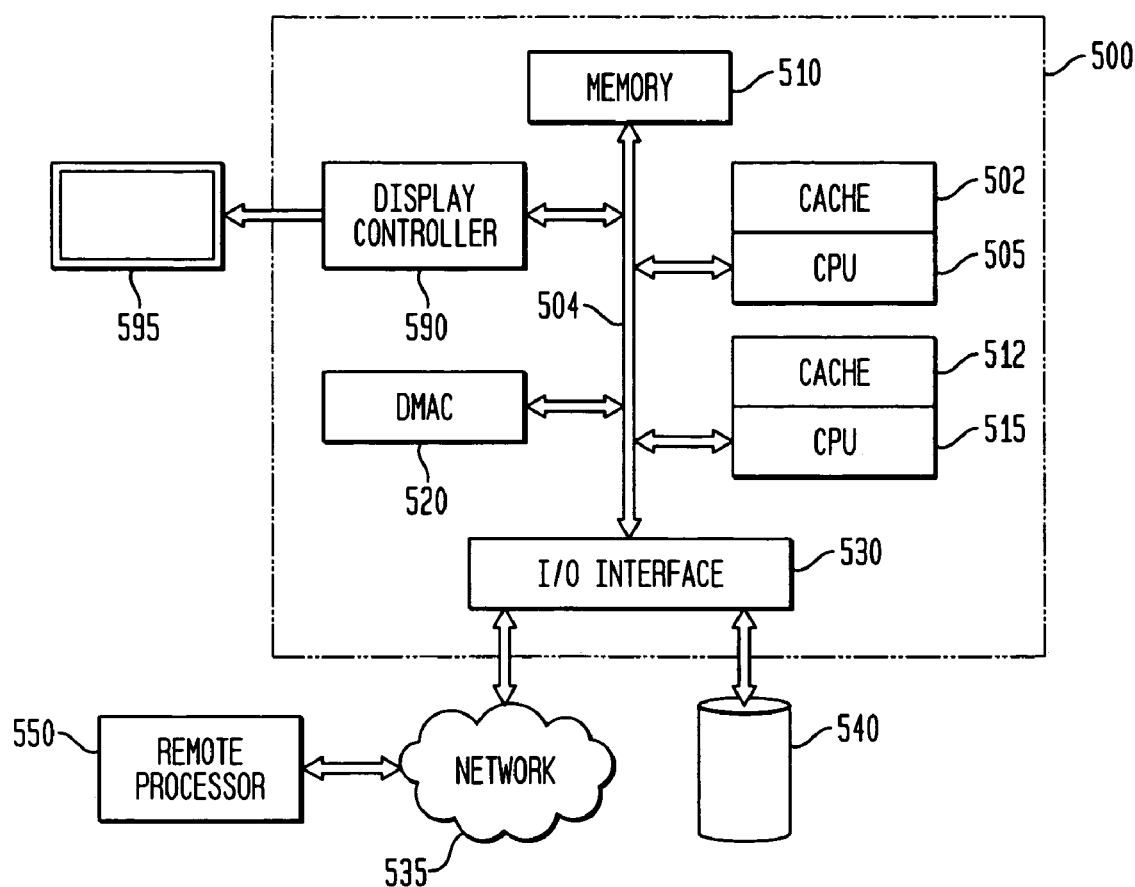
FIG. 5 is a diagram illustrating a processor according to one embodiment of the invention, as shown coupled to a network.

FIG. 5 illustrates an alternative processor 500 according to another embodiment of the invention. As shown therein, processor system 500 includes a central processor unit ("CPU") 505, which may include a single processor element operable to execute instructions in a single instruction single data ("SISD") manner. Alternatively, the CPU 505 includes a plurality of processor elements operable to execute instructions in a single instruction multiple data ("SIMD") manner. In still another alternative, CPU 505 can include a plurality of independent or semi-independent processor elements (not shown), each of which is operable to execute instructions in a manner which is more or less independent of any other processor element. In yet another alternative, CPU 505 can have an organization which represents a combination of the foregoing described types of processor organization. CPU 505 preferably is provided with a cache 502 for storage of instructions and data for execution of one or more programs by the CPU 505.

Although not a required element, preferably, processor 500 also includes a graphics processor unit ("GPU") 515, the GPU being specially designed for the efficient manipulation of graphics data. In such case, GPU 515 may handle most image data processing tasks for processor 500, and CPU 505 may handle most other tasks. Alternatively, CPU 505 and GPU 515 can cooperate in processing image data. Similar to CPU 505, GPU 515 preferably is provided with a cache 512 for storage of instructions and data for execution of one or more programs by the GPU 515.

While the CPU 505 can be organized in any of the many ways described above, for simplicity, the description to follow will focus on an arrangement in which CPU 505 includes a single processor element, and in which GPU 515 includes a single processor element.

CPU 505 and GPU 515, when present, are coupled to a bus 504 for transfer of data, instructions, commands, and addresses to and from the CPU 505 and GPU 515 to a memory 510. Memory 510 is preferably implemented in any suitable solid-state technology, including but not limited to dynamic random access memory (DRAM), static random access memory (SRAM), flash memory, magneto-resistive random access memory (MRAM).

The transfer of data, which may include operands and/or instructions, may take place as direct memory access ("DMA") operations between memory 510 and a corresponding cache memory 502 associated with CPU 505, or a cache memory 512 associated with CPU 515, under the control of a direct memory access controller ("DMAC") 520, which is coupled to bus 504. Stated another way, DMAC 520 performs the transfer of such data without the involvement of CPU 505 or GPU 515 during each step of communication between memory 510 and cache memory 502 (or cache memory 512) that is required to perform the transfer. Processor 500 preferably also includes a display controller 590 for generating images for display upon a display screen 595. Bus 504 is further coupled to an input output interface ("I/O interface") 530 for transfer of information such as data, instructions, commands and addresses to external storage 540. Transfers between memory 510 and external storage 540 are preferably performed as direct memory access operations under the control of DMAC 520.

The I/O interface 530 is further coupled to a network 535 for transfer of information such as data, instructions, commands and addresses to other devices such as to another networked processor 550. Network 535 can be any type of network. For example, the network 535 is not limited to one having either a local area network (LAN) topology or wide area network (WAN) topology, and is not limited to either wired or wireless networks. Further, the type of network 535 is not limited to those having as a primary purpose the transport of communications between computers, such as packet-switched, e.g. internet protocol (IP) networks, x.25 and cell transport networks such as Asynchronous Transfer Mode ("ATM") networks. Further, the network 535 is not limited to any specific type of network, e.g., wireless networks including but not limited to cellular digital packet data ("CDPD"), general packet radio services ("GPRS"), but also more general purpose legacy networks such as public switched telephone networks ("PSTN"), cable communications networks, satellite communications networks and the like.

Processor 550 can be referred to as a "remote" processor because communications between it and processor 500 must pass through the network 535. As relates to processors 500 and 550, the term "remote" has no other meaning. Stated another way, the term "remote" does not signify or imply any minimum distance between the processor 500 and processor 550, and does not signify or imply any difficulty in communication between processor 500 and processor 550, other than that communications must pass through network 535.

In one embodiment, processor 550 is internally organized in the same or similar manner to processor 500, having a DMAC, an internal memory, and at least one a CPU having a cache, in which case, there is said to be a network of "homogeneous" devices. Alternatively, processor 550 is organized differently, in which case, the network is "heterogeneous". For example, processor 550 may omit one or more of the following elements from its internal organization: a solid-state random access memory, a DMAC or a cache. The transfer of data between processor 500 and processor 550, preferably is performed by direct memory access, such as under the control of, or with the assistance of DMAC 520.

The embodiments of the invention described herein find particular application to the transfer of data between a memory, such as a main memory, and another memory, such as a local memory, to support the processing of data. For example, in a particular embodiment, data is transferred between a memory such as DRAM 225 (FIG. 2) and a local memory 406 of an APU (FIG. 4). Alternatively, in one example, data is transferred between a memory 510 and a cache 512 of a GPU 515 (FIG. 5). Particular embodiments of the invention are applied to such transfer of data to support the encoding and/or decoding of image data according to a compressed format such as MPEG-2. A brief description of the organization and flow of image data encoded according to the MPEG-2 will be helpful to an understanding of the embodiments of the invention described below.

Figure 6A:
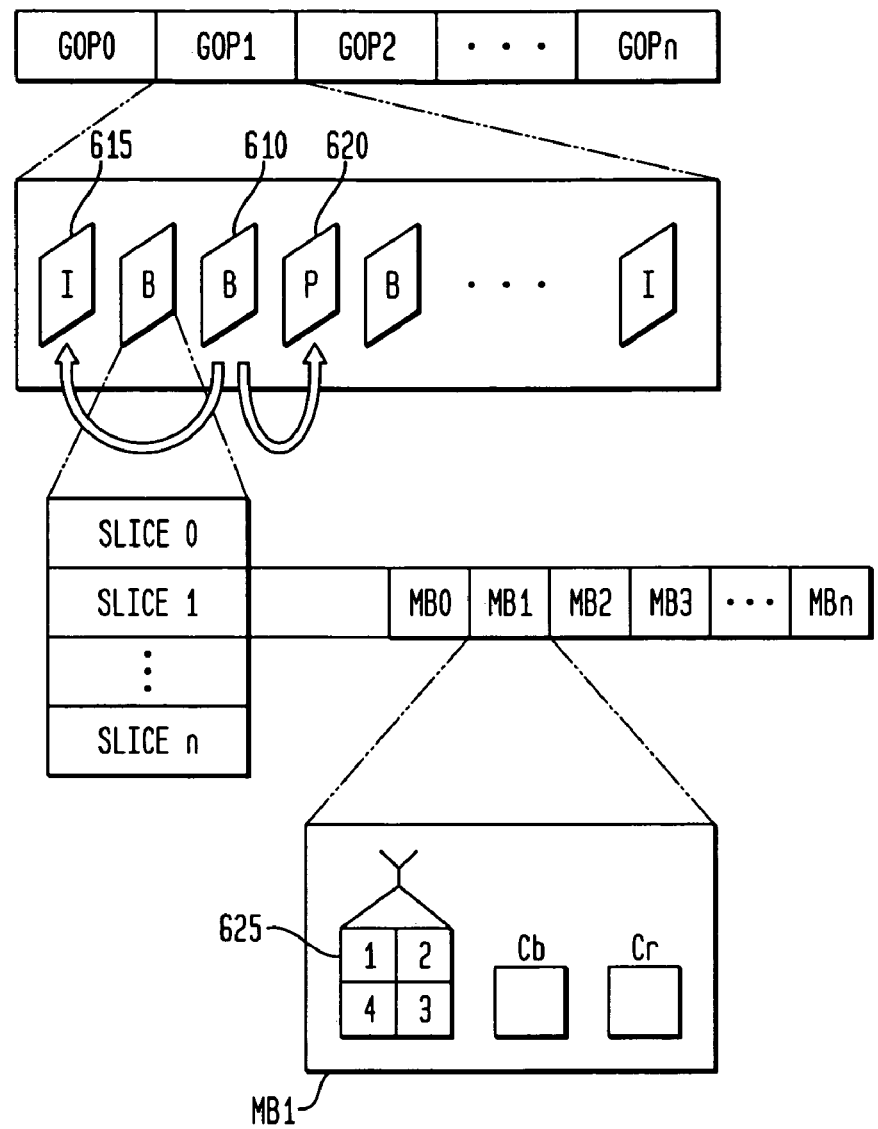
FIG. 6A is a diagram illustrating principles of video encoding according to MPEG-2.

MPEG-2 specifies both video and audio encoding formats. The principles of MPEG-2 encoded video are illustrated in FIG. 6A. As shown therein, an MPEG-2 encoded video sequence, e.g., a scene from a movie, such as may be recorded on a digital video disc (DVD), includes an ordered sequence of groups of "pictures" GOP0, GOP1, GOP2, . . . , GOPn, wherein the "pictures" in each group contain all the encoded image information necessary to display a sequence of actual frames of video on a display device such as a monitor or a television receiver. As encoded according to MPEG-2, each group of pictures (GOP) includes up to three different types of "frames", each type representing an encoded compressed version of the pixels of an actual displayable video frame or image. For ease of reference, a frame of video as displayed on a monitor or television receiver will be hereinafter referred to as an "image", as distinguished from an encoded "frame" of a GOP. The different types of frames permit the video data to be compressed temporally. Stated another way, video data is compressed such that only a few frames of the GOP of type "I" (intra) have complete information for encoding an image, while most frames, having type P (predicted), or B (bi-directional interpolated), include only data that indicates the difference between that frame (P) or (B) and one or more other frames that precedes it or follows it. The decoding of a particular B type frame requires that corresponding data from both a preceding frame and a succeeding frame be available to decompress the image data therein.

The B and P type frames are the ones that typically occur most frequently in a GOP. Therefore, they are the type most frequently accessed during the display of a video sequence, and the ones most frequently accessed from one type of memory, e.g., a local memory closely associated with a processor, e.g., a cache, and another, e.g., a main memory for a computing system.

Particular examples are shown by the curved arrows drawn between B type frame 610 and I type frame 615, and between B type frame 610 and P type frame 620. When such B type frame 610 is queued at a processor for decoding, the I frame 615 and the P frame 620 to which the B frame 610 refers must be accessed in order for the image corresponding to the B frame 610 to be displayed.

As further shown in FIG. 6A, each encoded frame of a GOP is organized into "slices", each representing a horizontally extending portion of an image. Each slice, e.g., Slice 0, Slice 1, . . . , Slice n, is organized into an ordered sequence of individual macroblocks MB0, MB1, MB2, MB3, . . . , MBn. Particularly in the context of B and P type frames, each macroblock, e.g., MB1, in turn, contains compressed data representing a 16×16 size array of pixels of the image. Each macroblock further contains a group of four "blocks", 625 referenced at 1, 2, 3 and 4 of luminance (Y) data, each block containing encoded compressed information regarding the greyscale values of an 8×8 array of pixels of the image. Each macroblock further contains blocks which contain two types of encoded color difference information for the same 16×16 pixel area of the image, namely chroma blue data and chroma red data. The chroma blue (Cb) data and the chroma red (Cr) data are each one block, rather than four blocks, as is the case for luminance data (Y), because the conclusions of human interface studies by MPEG-2 permit image color resolution in each direction to be reduced by half. Decoding of a B type frame is performed using information from a macroblock for a preceding or "past" frame and a macroblock for a succeeding or "future" frame of a GOP. This decoding is performed at the level of a macroblock.

Figure 6B:
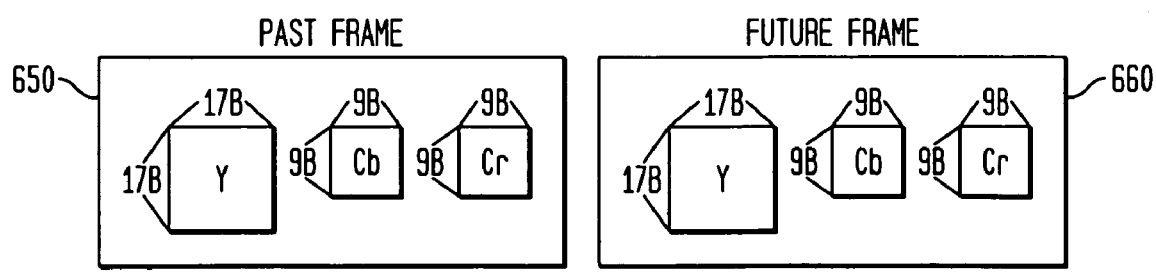
FIG. 6B is a diagram illustrating organization of motion compensation blocks for a past frame and a future frame of progressively scanned video.

FIG. 6B illustrates an organization of image data according to motion compensation blocks ("MCBs") which relate to frames of progressively scanned, i.e., non-interlaced video. As evident from FIG. 6B, the organization of data is not unique to past or future frames. Typically, a particular frame that now represents a "future" image will eventually become the "present" frame, and then later on, a "past" frame. FIG. 6B shows one MCB 650 that relates to a past frame and one MCB 660 which relates to a future frame. Such MCBs preferably contain data which is usable for a particular purpose, such as for providing motion compensation for movement of the image from one frame to another. As shown in FIG. 6B, MCB 650 includes a 17 byte×17 byte array of luminance (Y) data, as well as a 9 byte×9 byte array of chroma blue (Cb) data and a 9 byte×9 byte array of chroma red (Cr) data. Since a macroblock (FIG. 6A) each contains a 16×16 array of luminance (Y) data and one 8×8 array each of Cr data and Cb data, a particular MCB 650 or 660 contains data which overlaps two or more macroblocks.

When the present frame in a GOP is a B type frame, one past MCB 650 and one future MCB 660 must be accessed. Together, the two MCBs 650, 660 contain six different byte arrays of data, i.e., arrays of data that are stored separately and typically, must be fetched from by separate fetch operations.

Figure 7:
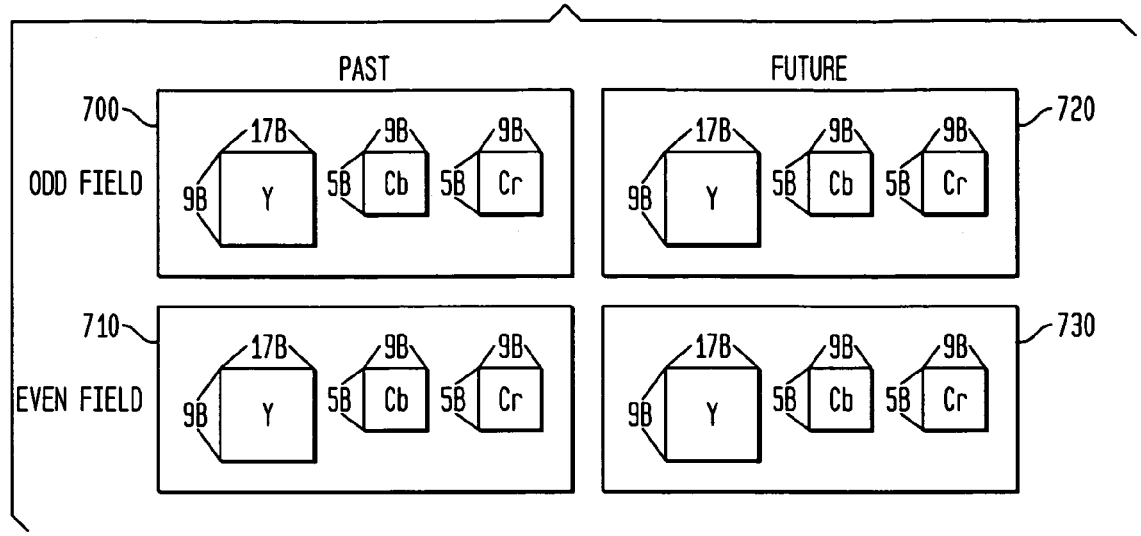
FIG. 7 is a diagram illustrating organization of motion compensation blocks of odd and even fields of a past frame and odd and even fields of a future frame of interlaced video.

FIG. 7 illustrates the data organization within other types of MCBs 700, 710 of a past frame of interlaced video, and MCBs 720, 730 of a future frame of interlaced video, such interlaced video being that such as formatted according to a standard adopted by the National Television Systems Committee (NTSC). That is, FIG. 7 illustrates the data organization of an MCB 700 of an odd field of a past frame of interlaced video and the data organization of an MCB 710 of an even field of the past frame. Similarly, FIG. 7 shows an MCB 720 of an odd field of a future frame, as well as an MCB 730 of an even field of the future frame. In the case of interlaced video, each of the MCBs 700, 710, 720, and 730 includes a 9 byte×17 byte array of luminance (Y) data, as well as a 5 byte×9 byte array of chroma blue (Cb) data and a 5 byte×9 byte array of chroma red (Cr) data. Unlike the case above, when a B frame is to be decoded, four MCBs 700, 710, 720, and 730, one each for the odd and even fields of both the past frame and the future frame of interlaced video must be accessed. Together, the four MCBs 700, 710, 720, and 730 contain twelve different byte arrays of data, i.e., arrays of data that are stored separately and typically, must be fetched by separate fetch instructions.

Figure 8:
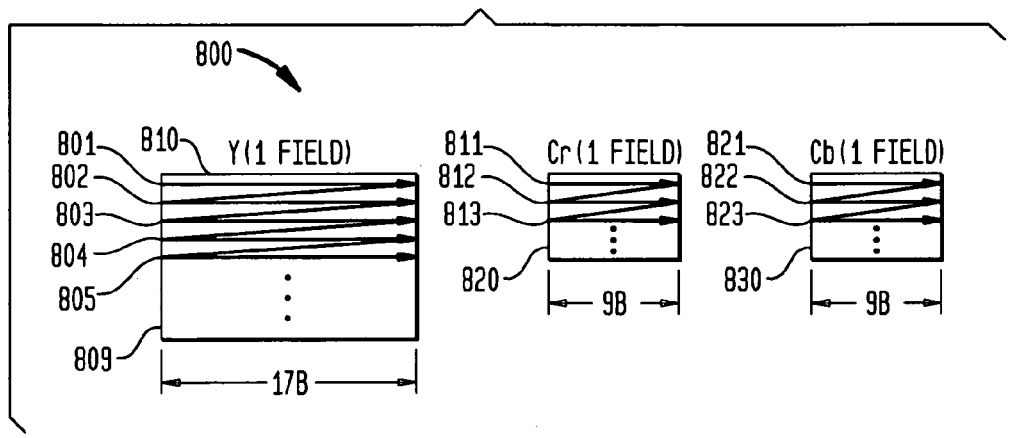
FIG. 8 illustrates a raster scan method of transferring data of a motion compensation block.

One shortcoming addressed by the embodiments of the invention described herein is the requirement for so many transfers of data to enable the decoding of image information associated with just one macroblock of a present frame for one image. As noted above with reference to FIG. 2 and FIG. 4, a direct memory access (DMA) method of transfer is preferred between a DRAM 225 and a local memory 406 of each SPU of a processor unit (PU) according to the system organization illustrated in FIGS. 1-4. Likewise, direct memory access by way of DMAC 520 is the preferred way of transferring data to and from a memory 510 and to a cache memory 502 or 512 in the alternative arrangement illustrated in FIG. 5. FIG. 8 illustrates a method of accessing the data contained in the byte arrays of an MCB 700 such as that shown in FIG. 7. Illustratively in FIG. 8, the Y (luminance) data 810 is transferred by a raster scan method involving separate transfer operations for each individual line 801, 802, 803, . . . 809 of the Y data 810, followed by the raster scanning (transfers of individual lines 811, 812, 813, etc.) of the Cr (chroma red) data 820 and transfers of individual lines 821, 822, and 823, etc. of the Cb (chroma blue) data 830. Thus, for the MCB 800 shown in FIG. 8, typically each of the lines of the array 810 of Y data, the array 820 of Cr data and the array 830 of Cb data is transferred in a separate operation controlled by a DMAC, for example, the DMAC 205 (FIG. 2) or the DMAC 520 (FIG. 5). With reference to FIGS. 2 and 4, for the Cr data, as each row of the array is 9 bytes wide, the DMAC 205 executes transfers of data between the DRAM 225 and the local memory 406 on a line-by-line basis, wherein the DMAC 205 transfers 16 bytes of data including the 9 bytes of chroma data in the line. Since the Cr data block of the interlaced field contains five rows, five such 16-byte transfers must be performed by the DMAC 205 in order to access the Cr data for just one field of just one MCB for just one B-type frame. Likewise, the Cb data is transferred the same way, and also requires the DMAC to perform five transfer operations. However, in the case of the Y data, since each row of the array is 17 bytes wide, which is larger than the 16-byte transfer width, a 32-byte transfer operation is performed. Accordingly, the nine lines of the Y data are transferred line by line, each line being transferred between the DRAM 225 (FIG. 2) and the local memory 406 (FIG. 4) by a 32 byte transfer operation. In another example, referring to FIG. 5, the nine lines of "Y" data are transferred on a line-by-line basis by DMAC 520 between memory 510 and a cache memory 502 or cache memory 512. In yet another example, the nine lines of Y data are transferred on a line-by-line basis between external storage 540 and memory 510 under the control of DMAC 520.

Due to design constraints such as the cost of a memory system and need to operate at high frequencies, i.e., to conduct data transfers at high transfer rates, DMA controllers are typically hardware encoded, or otherwise programmed by firmware or middleware to transfer a minimum amount of data in each transfer operation. For example, a DMAC 205 (FIG. 2) is preferably hardware encoded to transfer a minimum of 128 contiguous bytes of data to or from a memory at one time. Unfortunately, the amount of data needed to be transferred for an individual line, i.e., 16 bytes for a line of Cb chroma data or Cr chroma data and 32 bytes for a line of Y data, is much less than the hardware transfer size of data, which is 128 bytes. These same considerations apply to the hardware transfer size of DMAC 520, which is also illustratively much larger than the length of an individual line to be transferred. In such case, for a 16 byte transfer operation, the hardware of the DMAC 205

(FIG. 2) transfers 128 bytes of data between the DRAM 225 (FIG. 2) and the local memory 406 (FIG. 4), and then discards that part of the 128 transferred bytes of data that is not needed. Thus, in such case, only 16 bytes is actually needed of the total amount transferred (128 bytes) for an individual line. This relationship provides a measure of the "bus efficiency" for utilization of data that is transferred by the DMAC 205 to and from the DRAM 225. Accordingly, when individual 16-byte wide lines of data are transferred by hardware transfer operations of 128 bytes each, the bus efficiency is 16/128, i.e. 12.5%. Conversely, 87.5% of the data transferred by each hardware transfer is discarded. In the case of 32-byte wide transfers, of data, the bus efficiency increases to 25%, since the usable part (32 bytes) of the data is one fourth (32/128) of the total amount of data transferred by hardware. Bus efficiency is similarly impacted in the processor 500 (FIG. 5), in which the size of each line transferred, e.g., 16 bytes, is only a fraction of the hardware transfer size of DMAC 520.

Moreover, it is evident that using a raster scan method requires that a great number of lines of data must be transferred to access the Y, Cr and Cb data of each MCB for both odd and even interlaced fields, of both past and future frames. Referring again to FIG. 7, the minimum number of DMAC controlled transfers of data equals the number of rows of each block of each of the MCBs shown therein. Thus, to access the Y data of the corresponding MCBs 700, 710, 720 and 730 of the four fields, at least 9+9+9+9=36 line transfers are required, since each Y block of each of the four MCBs has nine rows. However, to access the corresponding Cr data of the MCBs 700, 710, 720 and 730 of the four fields, at least 5+5+5+5=20 line transfers are required, since each Cr block of each of the four MCBs has five rows. Similarly, to access the corresponding Cb data of the MCBs 700, 710, 720 and 730 of the four fields, 5+5+5+5=20 line transfers are required, since each Cb block of each of the four MCBs has five rows. All total, 76 DMA transfer operations are required to access the MCBs of the odd and even fields of past and future frames in order to decode a B frame of a GOP.

Figure 9:
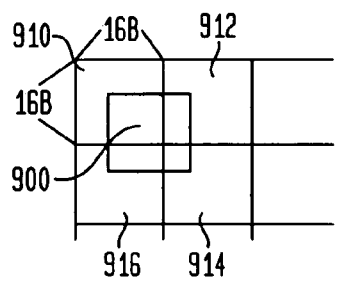
FIG. 9 illustrates the overlapping of a motion compensation block across data boundaries of a memory.
Figure 10:
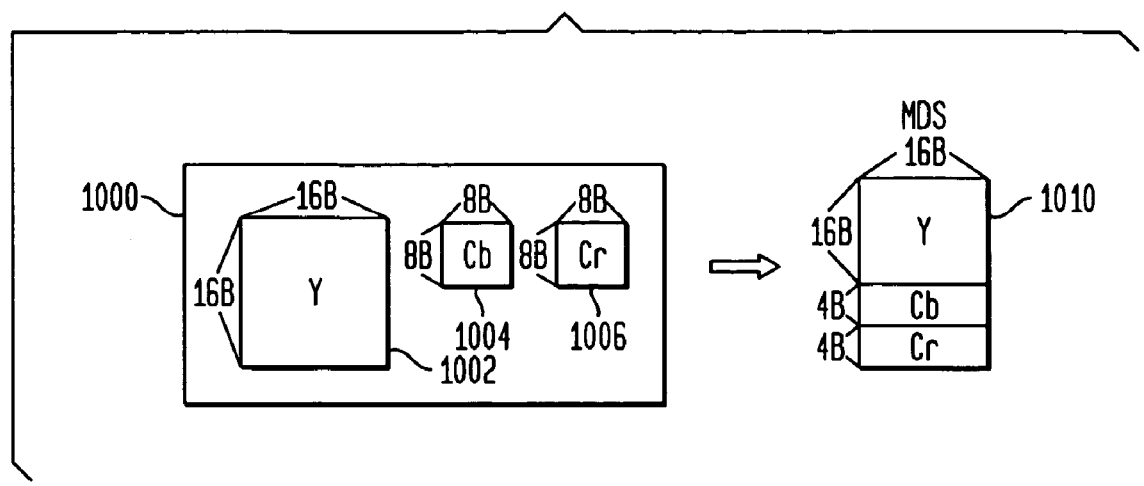
FIG. 10 illustrates an organization of a macroblock data structure (MDS) utilized in an embodiment of the invention.

FIG. 9 illustrates another complication for the raster scan method in that an MCB 900 of data is not always aligned in a memory along the boundaries of 16-byte wide regions 910, 912, 914 and 916 of data. In this case, block 900 can be a Y block, Cr block or Cb block of data of a frame or of a field of a frame, such as those shown and described above with respect to FIG. 6B or FIG. 7. When such misalignment occurs, as shown in FIG. 9, data must be accessed by DMA transfer from all four regions 910, 912, 914, and 916. If such misalignment were to occur for every line of every block of data to be transferred as described above with respect to FIG. 8, it is apparent that 4×76=304 transfers would be required. Performance degradation occurs as a result of many DMA requests in the form of DMA setup overhead. Also, DMA operation is slowed when the number of transfers being conducted at one time exceeds the number of allowable queue entries for the organization of the DMAC.

In addressing the foregoing concerns, a macroblock 1000 having a new organization is provided according to an embodiment of the invention. According to this embodiment, the Y data 1002, Cr data 1004 and Cb data 1006 of a macroblock 1000 are to be grouped together as a continuous data structure 1010, such that the macroblock data structure (hereinafter, "MDS") is capable of being accessed by one transfer operation as controlled by a DMA controller, such as DMAC 205 (FIG. 2) or DMAC 520 (FIG. 5). In addition, the MDS 1010 includes certain streamlining features, such as organization into 16-byte wide rows, of which there are 24. Thus, all of the information necessary to encode an MCB 700 (FIG. 7) of a field (odd or even) of a frame of video is stored in a MDS 1010 having 24 rows of data, each row having 16 bytes, for a total size of the MDS 1010 of 384 bytes. When such amount of data is transferred by a DMAC 205 (FIG. 2) or by DMAC 520 (FIG. 5), it is done using relatively few hardware transfer operations, because the 384 byte amount of the data to be transferred is a multiple (three times) of the hardware transfer amount (128 bytes). In addition, a bus efficiency of 100% is achieved when such MDS 1010 is transferred, because all of the data transferred per the 128-byte hardware transfer operations is delivered to the local memory as being data that was requested to be transferred, not merely an excess amount over the size of a line, as described above with reference to FIG. 8.

In a similar manner to that described above relative to FIG. 7, in the case of interlaced video, in the case of an MCB 700 for a B frame, it is apparent that four MDS's 1010 are required to be accessed, one for each odd field and each even field of the past frame, and one for each odd field and each even field of the future frame. If each MDS 1010 is aligned perfectly along boundaries of memory, then four DMA transfers are required, as long as the size of each transfer is 384 bytes. However, when each MDS 1010 is not aligned perfectly along boundaries of memory, the memory, e.g., DRAM 225 (FIG. 2) or memory 510 (FIG. 5), a greater number of transfers must be made to and from the memory in order to access the complete information of each MDS.

Figure 11:
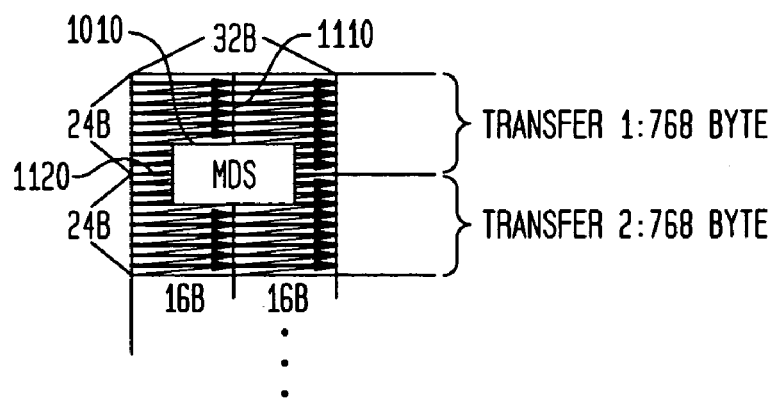
FIG. 11 illustrates the overlapping of a macroblock data structure across DMA transfer boundaries according to an embodiment of the invention.

An embodiment of the invention takes the possibility of misalignment into account by having each DMA transfer operation transfer 768 bytes of data rather than only 384 bytes, such that the same amount of data is transferred as is contained in two MDSs. In the 768-byte transfer operations Transfer 1, and Transfer 2 shown in FIG. 11, the data transferred in each such operation is desirably located in adjacent contiguous blocks of memory. For example, blocks of data to be transferred can be horizontally adjacent to each other, as shown in FIG. 11, or vertically adjacent to each other. In each such 768-byte transfer operation, when the data is accessed in horizontally adjacent locations, the data is transferred as two adjacent contiguous blocks of data adjoined at a 16-byte boundary 1110 in the horizontal direction, and having a vertical boundary 1120 occurring at a 24 row byte vertical interval.

Accordingly, when a particular MDS 1010 is misaligned to 16 byte boundaries and also misaligned to 24 row boundaries, the MDS 1010 can still be accessed in only two 768 byte DMA transfer operations, because sufficient data is accessed thereby. Turning again to the previous example of accessing the data for motion compensation processing using four macroblocks 1000 containing data for the odd and even fields of interlaced video for past and future frames, it is readily apparent that the four required MDSs can be accessed in maximum eight 768-byte DMA transfer operations, because a maximum of two such transfer operations are needed for each MDS.

Moreover, the maximum eight DMA transfers required to access an MDS is an advantageously small number which falls within the queue size of a DMA controller such as DMAC 205 (FIG. 2), or DMAC 520 (FIG. 5). The queue size of a DMA controller is limited by design, due to hardware cost constraints. The queue size represents the maximum number of outstanding DMA transfer requests that can be enqueued at one time. Thus, in systems having a limited DMA queue size of 16, for example, a maximum of 16 requested transfer operations can be outstanding at one time. If the number of requested transfer operations exceeds the queue size, it cannot be serviced by the DMA controller.

In the present embodiment, the maximum eight transfer operations required to support motion compensation processing for interlaced video using past and present frames falls below the maximum number 16 of allowable DMA queue entries. Therefore, DMA setup overhead is avoided and no DMA performance degradation will be suffered therefrom.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of transferring data for processing of an image between a first memory and a second memory accessible by a processor, comprising:
providing data in the first memory for processing of the image, the data being organized into a plurality of blocks, wherein each block relates to a portion of the image;
transferring at least some of the data by a direct memory access controller (DMAC) in units of a block between the first memory and the second memory, wherein each block contains exactly a whole number times a first data quantity, the first data quantity being defined by an amount transferable by hardware of the DMAC in a single hardware data transfer operation, the step of transferring including transferring each first data quantity in the single hardware data transfer operation; and
accessing at least a portion of the data from at least one of the first memory or the second memory for use in processing the image for display of the image.

2. The method of claim 1, wherein the image has an area defined by an image width in a lateral direction and an image height in a vertical direction, the image includes a plurality of the portions, and each of the portions has width smaller than the image width and height smaller than the image height.

3. A method as claimed in claim 1, wherein the second memory is a local memory dedicated to the processor.

4. A method as claimed in claim 1, wherein each portion of the image to which each block relates is rectilinear.

5. A method as claimed in claim 4, wherein each portion of the image to which each block relates includes a predetermined plurality of pixels having a first plurality of pixels disposed in a lateral direction and a second plurality of pixels disposed in a vertical direction, wherein the first plurality of pixels and the second plurality of pixels have either the same number of pixels or a different number of pixels.

6. A method as claimed in claim 5, wherein the data includes a plurality of bytes, wherein each pixel is represented by one or more bytes.

7. A method as claimed in claim 6, wherein the plurality of bytes includes 384 bytes arranged as an array of bytes having 24 rows of bytes and 16 columns of bytes, the first data quantity including a whole number of the rows.

8. A method as claimed in claim 1, wherein the first memory does not include either a memory local to the processor or a cache and the second memory includes at least one of a memory local to the processor or a cache.

9. A method as claimed in claim 1, wherein the first memory is operable to be accessed by the processor at a first rate and the second memory is operable to be accessed by the processor at a second rate faster than the first rate.

10. A method as claimed in claim 1, wherein each of the blocks includes a first array of data units representing luminance data, a second array representing first chroma data, and a third array representing second chroma data.

11. A method as claimed in claim 10, wherein each of the data units consists of a plurality of whole bytes of data.

12. A method as claimed in claim 1, wherein the data is compressed.

13. A method as claimed in claim 12, wherein the data includes luminance data and chroma data, the data being compressed according to a Motion Picture Experts Group (MPEG) format.

14. A method as claimed in claim 1, wherein at least some of the blocks contain data for performing motion compensation processing.

15. A processor operable to process data for display of an image, the data being organized into a plurality of blocks stored in a first memory, the processor operable to control a direct memory access ("DMA") controller to transfer the data in units of a block from the first memory to a second memory accessible by the processor, each block containing a whole number times a first data quantity, the first data quantity being defined by an amount transferable by hardware of the DMA controller in a single hardware data transfer operation, such that the DMA controller is operable to transfer each block by transferring each first data quantity in the single data transfer operation, the processor being further operable to access the data from the second memory to process the data.

16. A system, comprising:
a processor;
a first memory operable to store data for processing of an image by the processor;
a second memory accessible by the processor; and
a direct memory access controller (DMAC),
wherein the data is organized into a plurality of blocks, each block containing exactly a whole number times a first data quantity, the first data quantity being defined by an amount transferable by hardware of the DMAC in a single hardware data transfer operation, and the DMAC being operable to transfer one or more of the plurality of blocks of the stored data between the first memory and the second memory in by transferring each first data quantity in the single hardware data transfer operation.

17. A system, comprising:
a plurality of processors each operable to process data for display of an image; and
a direct memory access controller,
wherein the data is organized into a plurality of blocks, each block containing exactly a whole number times a first data quantity, the first data quantity being defined by an amount transferable by hardware of the DMAC in a single hardware data transfer operation, and the DMAC being operable upon request of a processor of the plurality of processors to transfer one or more of the plurality of blocks of the data between the main memory and a local memory dedicated to the requesting processor by transferring each first data quantity in the single hardware data transfer operation.

18. A system, comprising:

a plurality of processors;

a main memory shared by the plurality of processors, the main memory operable to store data for processing of an image by at least one of the processors;

a plurality of local memories, each local memory being dedicated to a particular processor of the plurality of processors; and a direct memory access controller ("DMAC"), wherein the data is organized into a plurality of blocks, each block containing exactly a whole number times a first data quantity, the first data quantity being defined by an amount transferable by hardware of the DMAC in a single hardware data transfer operation, and the DMAC being operable upon request of a processor of the plurality of processors to transfer one or more of the plurality of blocks of the stored data between the main memory and the local memory dedicated to the requesting processor by transferring first data quantity in the single hardware data transfer operation.

19. A recording medium having instructions recorded thereon for performing a method of transferring data for processing of an image between a first memory and a second memory accessible by a processor, the method comprising:

providing data in the first memory for processing of the image; and transferring one or more of the plurality of blocks of data by a direct memory access controller ("DMAC"), each block relating to a portion of the image and containing exactly a whole number times a first data quantity, the first data quantity being defined by an amount transferable by hardware of the DMAC in a single hardware data transfer operation, the one or more blocks of data being transferred in units of a block between the first memory and a second memory by transferring each first data quantity in the single hardware data transfer operation.

* * * * *

UNITED STATES PATENT AND TRADEMARK OFFICE
CERTIFICATE OF CORRECTION

PATENT NO. : 7,304,646 B2  
APPLICATION NO. : 10/922670  
DATED : December 4, 2007  
INVENTOR(S) : Eiji Iwata Page 1 of 1

It is certified that error appears in the above-identified patent and that said Letters Patent is hereby corrected as shown below:

Column 14, line 49 delete "in".

Signed and Sealed this

Fourth Day of November, 2008

JON W. DUDAS  
*Director of the United States Patent and Trademark Office*